(12) United States Patent
Saika et al.

(10) Patent No.: US 7,103,713 B2
(45) Date of Patent: Sep. 5, 2006

(54) STORAGE SYSTEM, DEVICE AND METHOD USING COPY-ON-WRITE FOR SYNCHRONOUS REMOTE COPY

(75) Inventors: Nobuyuki Saika, Yokosuka (JP); Naohiro Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 10/898,356

(22) Filed: Jul. 26, 2004

(65) Prior Publication Data

US 2005/0240803 A1 Oct. 27, 2005

(30) Foreign Application Priority Data

Mar. 31, 2004 (JP) ............................. 2004-103821

(51) Int. Cl.
G06F 12/16 (2006.01)
G06F 12/02 (2006.01)

(52) U.S. Cl. .................. 711/112; 711/156; 711/161; 711/162; 711/165; 714/6

(58) Field of Classification Search ................ 711/112
See application file for complete search history.

(56) References Cited

U.S. PATENT DOCUMENTS 5,649,152 A * 7/1997 Ohran et al. ................ 711/114
6,269,431 B1 7/2001 Dunham
6,526,487 B1 * 2/2003 Ohran et al. ................ 711/162
6,697,866 B1 * 2/2004 Arakawa et al. ............ 709/229
6,883,073 B1 4/2005 Arakawa et al.
2002/0169925 A1 * 11/2002 Achiwa et al. .............. 711/112
2003/0182313 A1 9/2003 Federwisch et al.
2003/0221077 A1 11/2003 Ohno et al.
2004/0133602 A1 7/2004 Kusters et al.

OTHER PUBLICATIONS

"Implementing ESS Copy Services on S/390", Dec. 2000.

* cited by examiner

Primary Examiner—Donald Sparks
Assistant Examiner—Jesse Diller
(74) Attorney, Agent, or Firm—Mattingly, Stanger, Malur & Brundidge, P.C.

(57) ABSTRACT

A first data transfer module sends update data to be written into a primary volume to a second data transfer module; the second data transfer module stores the update data into a secondary volume, stores differential data written to a storage address for the update data in the secondary volume into a second differential volume, updates a second management information holding module, and then informs completion of the data updating to the first data transfer module; and the first data transfer module stores the update data to an update address in the primary volume when the information of completion of the data updating is received from the second data transfer module, stores the differential data into a first differential volume, and updates a first management information holding module.

13 Claims, 10 Drawing Sheets

<PRIMARY VOLUME>

| STORAGE ADDRESS | DATA |
|---|---|
| P1 | AAAAA |
| P2 | BBBBB |
| P3 | CCCCC |
| : | : |

<DIFFERENTIAL VOLUME>

| STORAGE ADDRESS | DATA |
|---|---|
| D1 | |
| D2 | |
| D3 | |
| : | : |

<MAPPING TABLE>

| PRIMARY VOLUME STORAGE ADDRESS | CHANGED/ UNCHANGED BIT MAP | SNAPSHOT 1 DIFFERENTIAL VOLUME STORAGE ADDRESS |
|---|---|---|
| P1 | UNCHANGED | |
| P2 | UNCHANGED | |
| P3 | UNCHANGED | |
| : | UNCHANGED | |
| : | UNCHANGED | |

FIG. 3

STORAGE SYSTEM, DEVICE AND METHOD USING COPY-ON-WRITE FOR SYNCHRONOUS REMOTE COPY

CLAIM OF PRIORITY

The present application claims priority from Japanese application P2004-103821 filed on Mar. 31, 2004, the content of which is hereby incorporated by reference into this application.

BACKGROUND

This invention relates to a storage system having a snapshot function, and more particularly to a technique for transferring data of a snapshot.

In an information society, one important role of a storage system that accumulates information is protecting data. The most common method of protecting data is a backup that saves a duplicate of data in a storage to a backup medium such as a tape. With the backup, even when the data in the storage is lost due to failure, a fault, an operational error, or the like, the data can be recovered based on the backup, thereby enabling recovery of the data at the time when saved and suppressing damage to a minimum.

However, as storage capacities expand, the amount of time necessary to make backups becomes a problem. Moreover, in applications that require frequent updating of data, even if the backup is made once, difference vis-a-vis the backup expand quickly. In the event of an accident, the damage may be great. Thus, backups must be made more frequently. Furthermore, in order to prepare for a case where a file is lost due to an operational error, or a case where one wants to compare file contents with a previous state, and other such cases, there is a desire to enable regular backups to be referenced easily.

As a function of handling these types of applications, a snapshot function has been receiving attention. The snapshot function is a function which maintains a data image in the storage currently being used at the moment when the snapshot is taken, and also enables access by means other than the storage currently being used. At the moment when the snapshot is obtained, the snapshot can be used without waiting for completion of all the data in the storage to be copied, thus minimizing the backup time which was a problem in making tape backups.

In order to maintain the snapshot, there is a method of using a saving storage area to save the data at the time when the snapshot is obtained (refer to U.S. Pat. No. 5,649,152).

According to this technique, once the snapshot of an operating volume is obtained, each time when an update subsequently occurs at a block that has not yet been updated, the old data in that block is copied to the saving storage area, and a virtual volume for providing the snapshot is also generated. When reading from the virtual volume, if the block at the address to be read has been copied to the saving storage area, that block is returned. If there is no copy in the saving storage area, then no update has occurred in the operating volume, so that the block at the same address in the operating volume is returned.

According to this technique, as compared to the case of saving in the separate volume all the data in the operating volume at the time when the snapshot is obtained, the image of the volume at the time when the snapshot is obtained can be maintained with small storage capacities.

Furthermore, regarding migration of data stored in the storage system, in order to migrate data being accessed from the superior device (host), an extended data transfer function (XRC: Extended Remote Copy) and a peer-to-peer data transfer function (PPRC: Peer-to-peer Remote Copy) have been proposed by IBM, Inc. (refer to "Implementing ESS Copy Services on S/390", IBM P.502.8.5 DASD migration).

SUMMARY

The above-mentioned snapshot is achieved by means of a primary volume, a differential volume, and a mapping table. However, when migrating snapshot data, no consideration was given to synchronizing these three while copying. Therefore, for example, when a time lag occurs in the copying between the primary volume, the differential volume and the mapping table, the snapshot data is not integrated during that period, and a problem occurred in that the image (virtual volume) from the time when the snapshot was created cannot be structured. Furthermore, even when the primary volume and the differential volume have been copied, when a fault occurs to the data transfer function and the mapping table is not copied, there is a problem in that the virtual volume of the snapshot cannot be composed.

It is therefore an object of this invention to provide a storage system capable of safely copying snapshot data.

According to this invention, there is provided a storage system, comprising a primary disk subsystem having a disk drive provided for normal use, a secondary disk subsystem having a disk drive that stores a duplicate of data stored in the primary disk subsystem, and a communications line that connects the primary disk subsystem and the secondary disk subsystem, the primary disk subsystem including a primary volume where normal reading and writing are performed, a first differential volume that stores differential data of a snapshot of the primary volume, a first management information holding module that manages the differential data, and a first data transfer module that transfers data to the secondary disk subsystem, the secondary disk subsystem including a secondary volume that stores a duplicate of the data stored in the primary volume, a second differential volume that stores differential data of a snapshot of the secondary volume, a second management information holding module that manages the differential data, and a second data transfer module that transfers data to the primary disk subsystem, wherein:

the first data transfer module sends update data to be written into the primary volume to the second data transfer module;

the second data transfer module: stores the update data in the secondary volume; stores the differential data written to the update address in the secondary volume into the second differential volume; updates the second management information holding module; and then informs completion of data updating to the first data transfer module; and the first data transfer module: stores the update data to the update address in the primary volume when the information of completion of the data updating is received from the second data transfer module; stores the differential data into the first differential volume; and updates the first management information holding module.

According to this invention, consistencies in the snapshot data can be maintained, and disaster recovery can be enhanced.

BRIEF DESCRIPTION OF THE DRAWINGS

FIG. 3 is an explanatory diagram of management of a snapshot according to a first embodiment of this invention.

DETAILED DESCRIPTION OF THE PREFERRED EMBODIMENTS

Hereinafter, explanation will be made of embodiments of this invention, with reference to the drawings.

Figure 1:
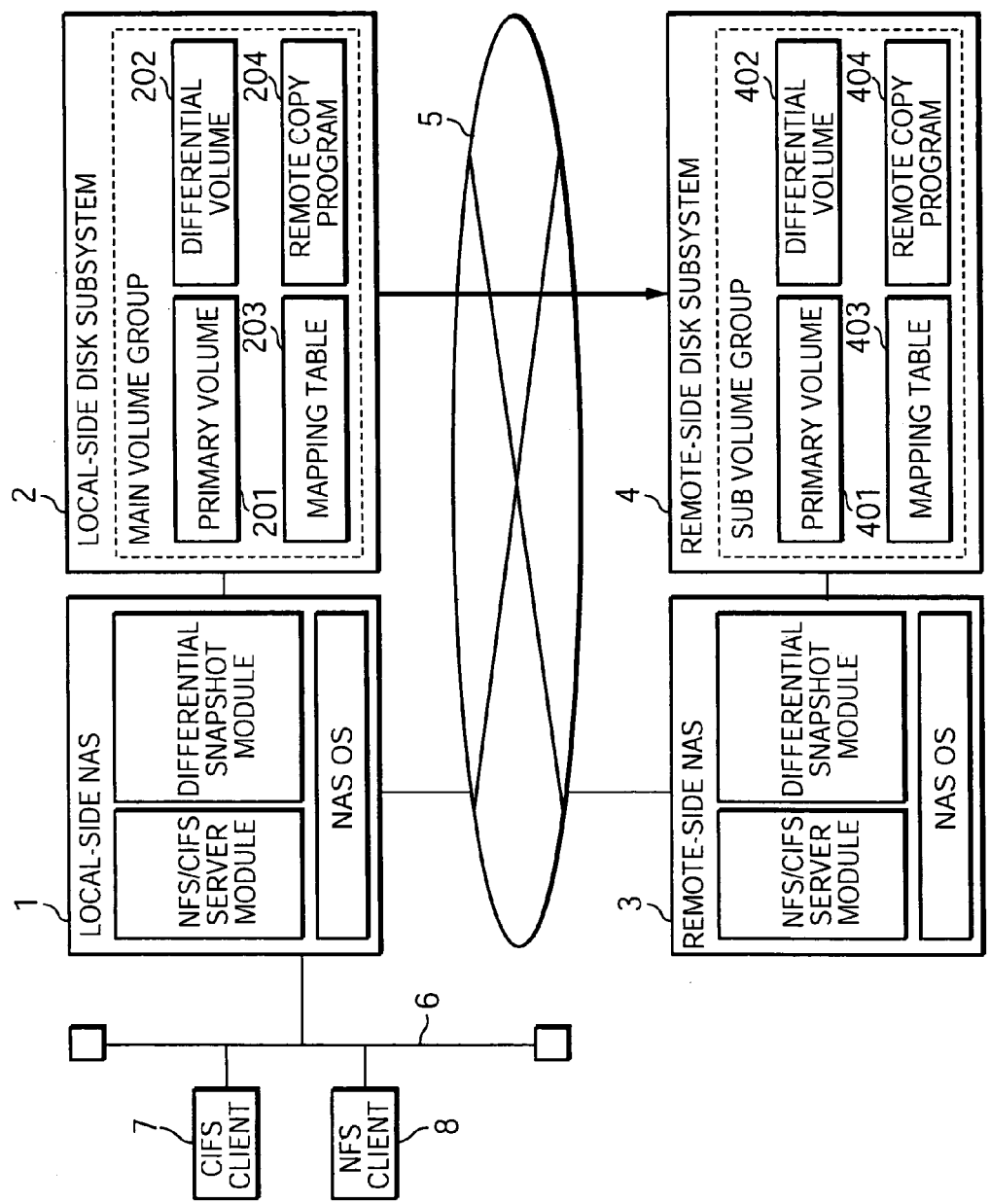
FIG. 1 is a block diagram showing a construction of a storage system according to a first embodiment of this invention.

FIG. 1 is a block diagram showing a construction of a storage system according to a first embodiment of this invention.

A NAS (Network Attached Storage device) 1 is connected to a disk subsystem 2. The local-side NAS 1 is connected via a network 6 to a client 7 using a CIFS (Common Internet File System), and to a client 8 using an NFS (Network File System). The network 6, for example, performs communications via TCP/IP or other such protocols. It should be noted that, Fibre Channel or iSCSI (internet SCSI) may also be used to perform the communications. The NAS 1 is provided with a file server (NFS/CIFS server module), and the file server provides file sharing service to the clients 7 and 8.

Furthermore, the NAS 1 is provided with a differential snapshot module. The differential snapshot module uses a differential snapshot creation program 122, a differential snapshot management program 123 and a differential snapshot composition program 124, which are described below, to create and maintain the snapshot and compose the virtual volume.

The local-side disk subsystem 2 is provided with a plurality of disk drives. The disk drives are set with logical units (LUs) recognized by operating system as single unit of disks. Furthermore, the disk drives constitute main volume groups, and the main volume groups are provided with a primary volume 201, a differential volume 202 and a mapping table 203.

Furthermore, the logical unit is constituted by a RAID (Redundant Array of Independent Disks), thus giving redundancy to the stored data. Therefore, even when a fault occurs to a part of the disk drives, the stored data is not lost.

The primary volume 201 is a volume provided for normal operation, which is accessed from the clients 7 and 8 to write data therein and read data therefrom. The differential volume 202 stores the data stored in the primary volume 201, when performing copy-on-write of the snapshot. The mapping table 203 stores relationships between the primary volume 201 and the differential volume 202, for each snapshot generation.

Furthermore, the disk subsystem 2 is provided with a remote copy module. The remote copy module detects addresses where changes occurred in the data stored in the main volume group, and transfers data to a remote-side disk subsystem 4, and is realized by executing a remote copy program 404 stored in the main volume group.

The remote side is provided with a remote-side NAS 3 and the remote-side disk subsystem 4, and can provide the same functions as the local-side NAS 1 and the local-side disk subsystem 2.

The local side and the remote side are connected through a data transfer network 5. The network 5 is connected so as to enable transfer of data between the local-side NAS 1 and the remote-side NAS 3, and between the local-side disk subsystem 2 and the remote-side disk subsystem 4, to send and receive signals (data and control signals) via a TCP/IP protocol.

It should be noted that, the network 5 may also be a SAN (Storage Area Network), where signals (data and control signals) are sent and received via a Fibre Channel protocol that is appropriate for data transfer.

It should be noted that, data backup from the local side to the remote side, can be performed between the NASs 1 and 3, or between the disk subsystems 2 and 4. In the following embodiments, explanations will be given regarding data backups between the disk subsystems 2 and 4, but this invention may also be applied in data backups between the NASs 1 and 3.

Furthermore, the explanation has been given regarding the embodiment where the NAS and the disk subsystem are provided separately on both the local side and the remote side, but this invention may be applied in a storage system where the NAS and the disk subsystem are integrated into a single unit.

Figure 2:
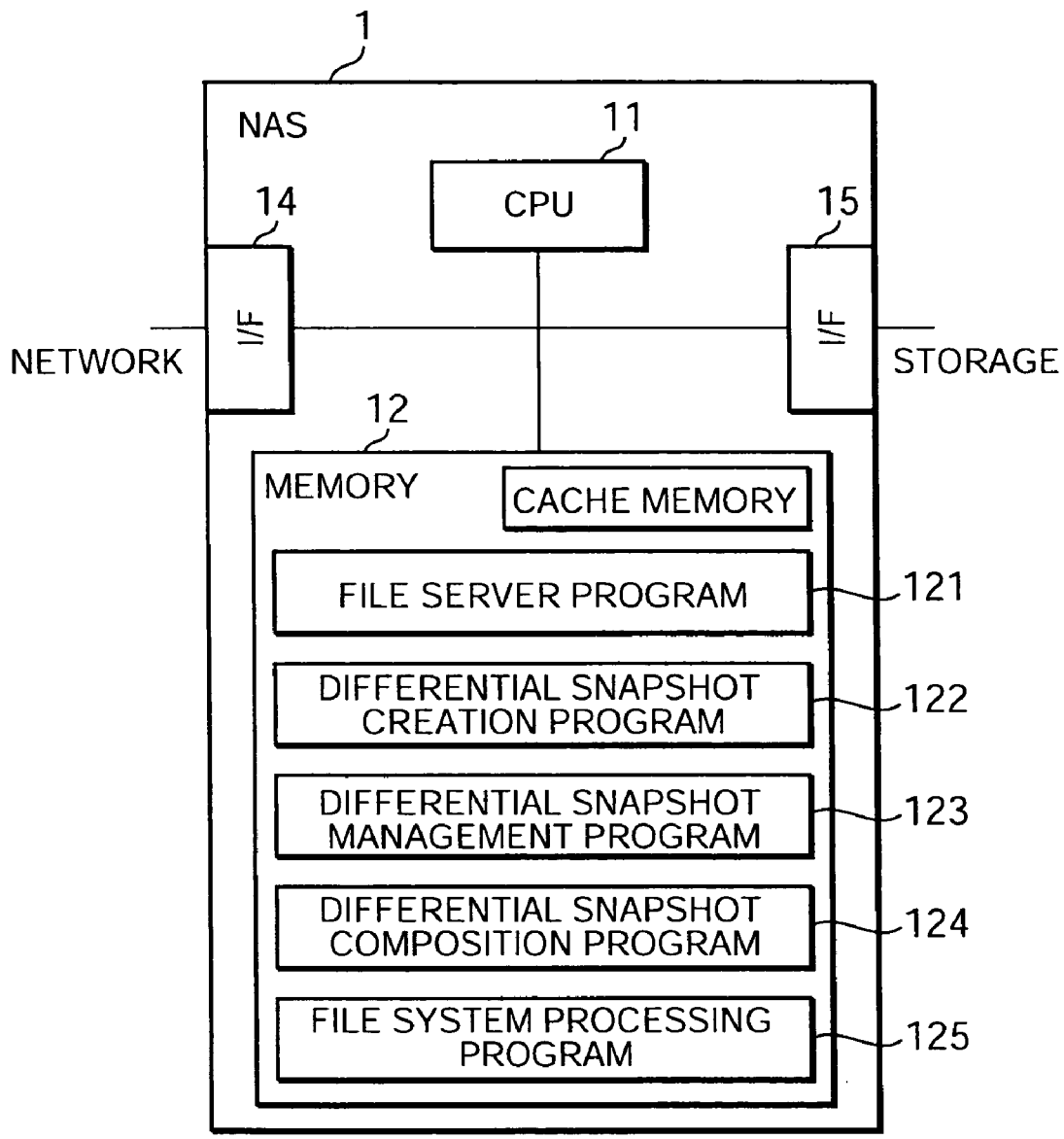
FIG. 2 is a block diagram showing a construction of a NAS according to a first embodiment of this invention.

FIG. 2 is a block diagram showing a construction of the NAS 1 according to a first embodiment of this invention.

The NAS 1 is provided with a CPU 11, a memory 12, a network interface 14, and a storage interface 15.

The network interface 14 sends and receives data and control signals to/from the clients 7 and 8 via a TCP/IP protocol.

The storage interface 15 sends and receives data and control signals to/from the disk subsystem 2, using the Fibre Channel.

The memory 12 is provided with a cache memory for temporarily storing data that is read and written to/from the disk. Furthermore, the memory 12 stores a file server program 121, the differential snapshot creation program 122, the differential snapshot management program 123, the differential snapshot composition program 124, and a file system program 125. The CPU 11 calls up and executes those programs, whereby various processings are performed.

The file server program 121, responding to a data access request from the clients 7 and 8, requests the file system program 125 to execute read processing from files or directories or write processing to files or directorys, and sends the result of this execution back to the clients 7 and 8.

The snapshot creation program 122 receives a snapshot creation request, and then creates the snapshot of the disk subsystem 2 primary volume. Specifically, the mapping table 203 area is set.

The differential snapshot management program 123 manages the differential volume 202 storing the differential data necessary to maintain the snapshot, and performs processing to write data according to the request from the file system program 125 and to maintain the snapshot. Specifically, when using the mapping table 203 to write the data to the primary volume 201, the differential data stored in the primary volume 201 is copied to the differential volume, and after that the update data is written into the primary volume 201 to update the stored content.

The differential snapshot composition program 124 uses the primary volume 201 and the differential volume 202 to read virtual volume according to the request from the file system program 125 (i.e., processing to make the snapshot usable). Specifically, the mapping table 203 is referenced, it is determined whether to read data from the primary volume 201 or from the differential volume 202, the data is then read from the determined volume, and then a virtual volume for providing the data stored in the primary volume 201 at the time of receiving the snapshot creation request is then composed.

The file system program 125, in response to read request to the files or directories and write request from the files or directories issued by the file server program 121 or the differential snapshot management program 123, designates the volume where a file and directory are being stored, and a block address and size to be accessed. Furthermore, requests for virtual volume read processing and write processing are issued to the snapshot composition program 124.

Figure 4:
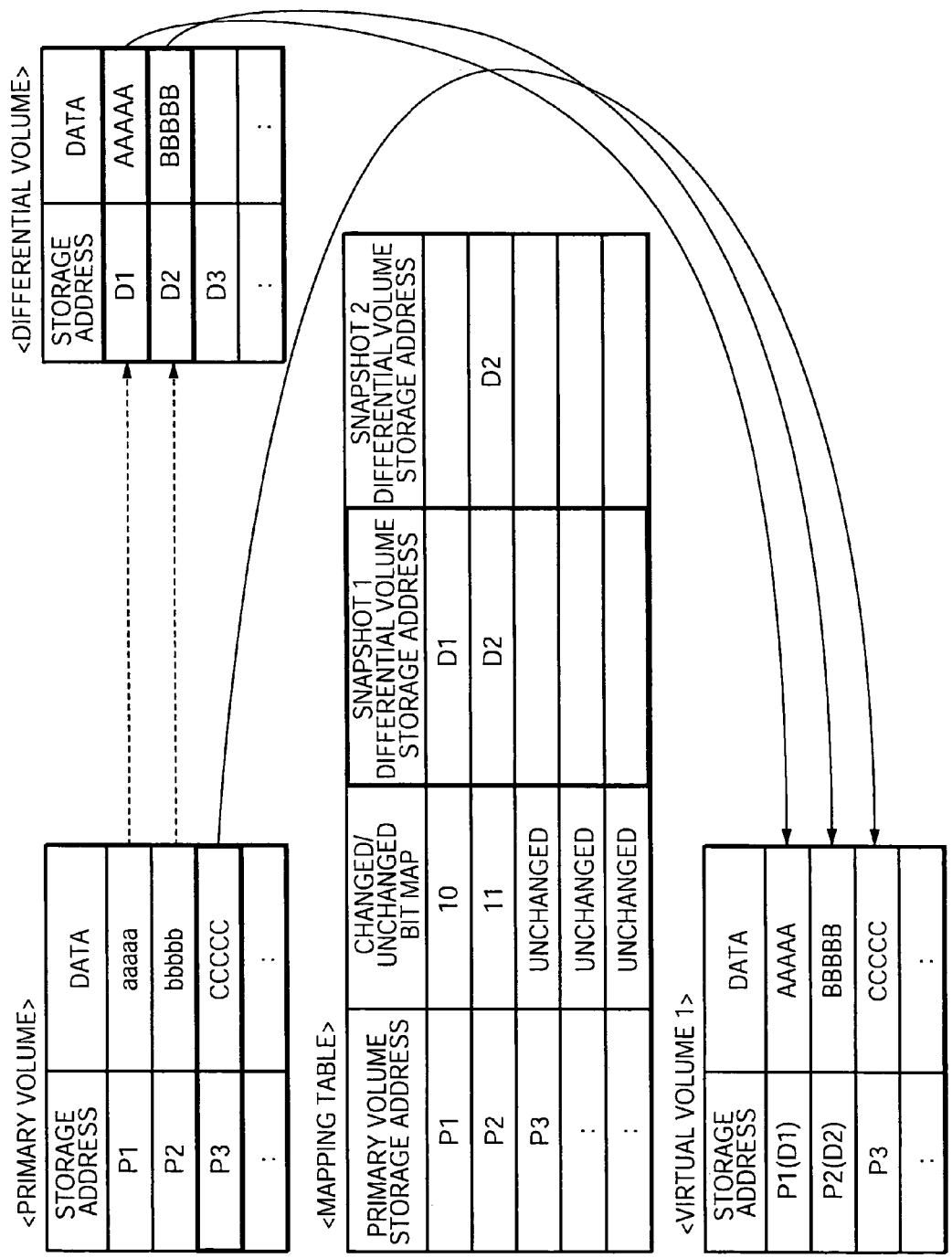
FIG. 4 is another explanatory diagram of management of the snapshot according to a first embodiment of this invention.

Next, explanation will be given regarding management of the snapshot. FIGS. 3 and 4 are explanatory diagrams of snapshot management according to a first embodiment of this invention.

The snapshot creation program 122 receives the snapshot creation request, and then registers identification information for the new virtual volume (in the "snapshot 1 differential volume storage address" column of mapping table in FIG. 3) into the mapping table 203. This virtual volume block, at the point in time when the snapshot is created, is associated in a one-to-one correspondence with a block in the primary volume 201, since no data storage address is registered in the differential volume storage address column in the mapping table 203.

After that, when updating the data inside the primary volume 201, the snapshot management program 123 copies the pre-update differential data in the primary volume 201 into the differential volume 202, and after copying, writes the update data into the primary volume 201, thus updating the primary volume 201 storage content. It should be noted that, the copying of the data from the primary volume 201 to the differential volume 202 may be performed by actually moving the data, or by rewriting a pointer that indicates the address where the data is stored.

Furthermore, the snapshot management program 123 updates the mapping table 203, so as to establish a correspondence between the block in the virtual volume 202 corresponding to the block in the primary volume 201 where the data was updated, and the block in the differential volume 202 storing the data (i.e., the pre-update data) that had been stored in the primary volume 201 at the time when the snapshot was created.

For example, in FIG. 4, between the creation of the snapshot 1 and the creation of a snapshot 2, when rewriting the data stored in P1 of the primary volume to "aaaaa", differential data "AAAAA" that was stored in P1 of the primary volume is copied into D1 of the differential volume, and then the update data "aaaaa" is stored in P1 of the primary volume. At this time, the differential data's storage address D1 is stored in the P1 column of the mapping table. Furthermore, a "1" indicating that differential data has been stored for the snapshot 1 is stored as the most significant bit of changed/unchanged bit map in the mapping table.

Furthermore, from the creation of the snapshot 2 until the present, when rewriting P2 in the primary volume to "bbbbb", differential data "BBBBB" that was stored in P2 of the primary volume is copied into D2 of the differential volume, and then the update data "bbbbb" is stored into P2 of the primary volume. At this time, the differential data's storage address D2 is stored in the P2 column of the mapping table. At this time, D2 is stored not only in the storage address of the differential volume of the snapshot 2, but also in the storage address of the differential volume of the snapshot 1 which requires this differential data. Furthermore, a "1" indicating that differential data is stored for the snapshots 1 and 2 is stored in the most significant bit and the second significant of the changed/unchanged bit map in the mapping table (i.e., "11" is stored in the bitmap showing whether there is a change).

When the file system program 125 issues a virtual volume access request to the snapshot composition program 124, the snapshot composition program 124 references to the mapping table, and reads out data from the primary volume block or the differential volume block that is associated with the virtual volume block. Therefore, the file system program 125 accesses the virtual volume, so as to be able to use the information stored in the primary volume at the time when the snapshot creation request was issued. Therefore, a snapshot image in the file system can be provided to the clients 7 and 8.

In other words, the virtual volume is a virtual volume that is constituted of storage area inside one or a plurality of disk devices. Actually, the virtual volume is constituted of a subset of the blocks in the primary volume, and a subset of the blocks in the differential volume.

For example, in FIG. 4, the virtual volume corresponding to the primary volume at the time when the snapshot 1 is created is obtained by reading out and composing the following: "AAAAA" which is the differential data corresponding to P1 and is stored in D1 in the differential volume, "BBBBB" which is the differential data corresponding to P2 and is stored in D2 of the differential volume, and "CCCCC" which is stored in P3 in the primary volume (since there is no differential data corresponding to P3, the data is read out from the primary volume).

Figure 5:
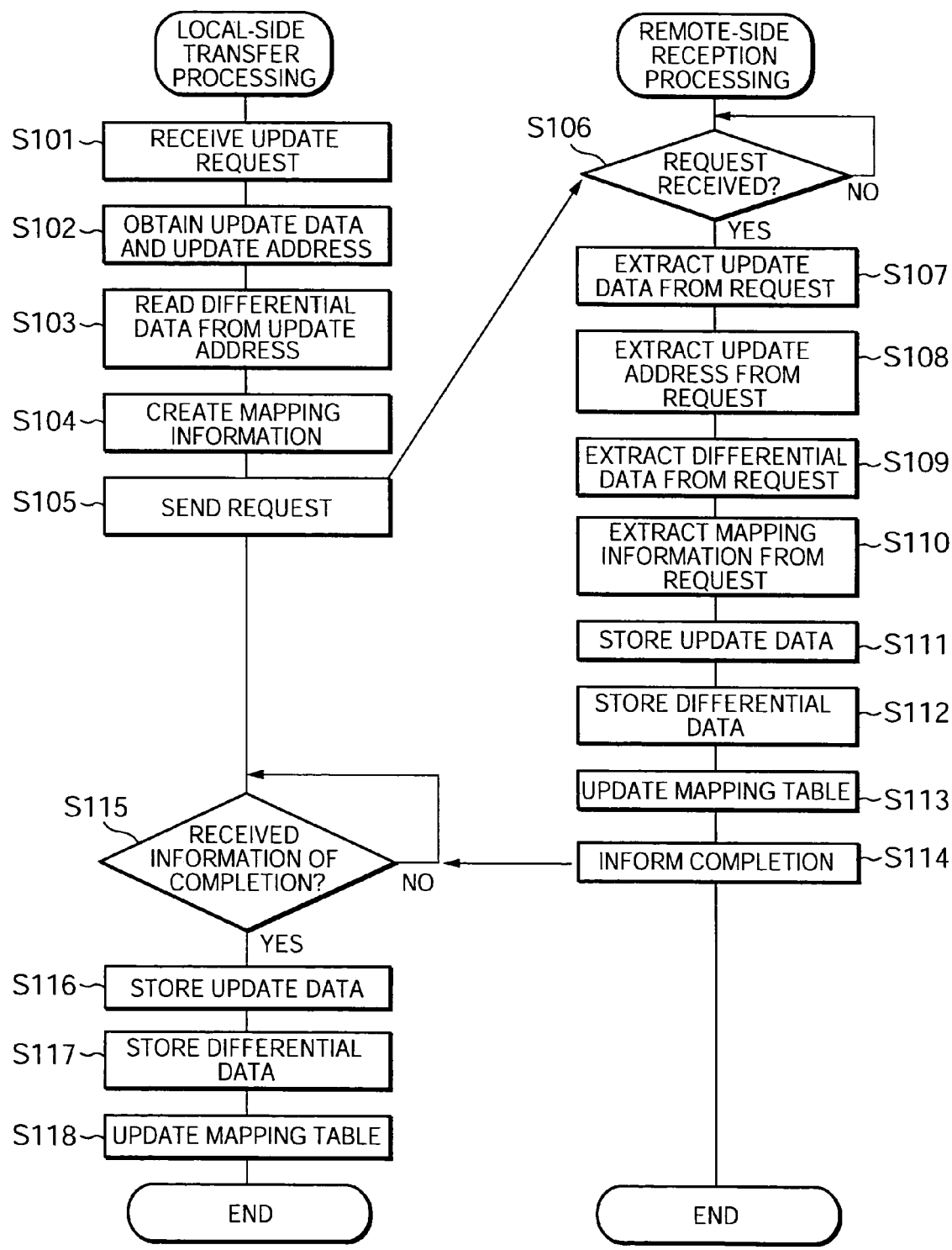
FIG. 5 is a flowchart of data transfer processing according to a first embodiment of this invention.

FIG. 5 is a flowchart of data transfer processing according to a first embodiment of this invention.

First, when the data update request from the differential snapshot management program 123 is received (i.e., the occurrence of copy-on-write based on the update request) (S101), a local-side data transfer module analyzes the update request and extracts the update data (the data to be written to the disk) and the data update address (the address where the data is to be written), which are included in the update request (S102). After that, the differential data (prior-to-update data) stored at the update address in the primary volume 201 is read out (S103). Furthermore, the area in the differential volume for storing the differential data is determined, and mapping information after data is updated (information about the area storing the differential data that is written to the update address in the mapping table) is created (S104). It should be noted that, at this stage, the mapping information is not written into the mapping table 203.

Then, the data which has been obtained as described above, the update address, the differential data, and the mapping information are combined as a group and included in a request, and this request is sent to the remote-side disk subsystem 4 (S105).

The remote-side data transfer module monitors the receiving of the request (S106). When the remote-side data transfer module receives the request from the local-side disk subsystem 2, the update data, the update address, the differential data, and the mapping information are extracted from the request that was received (S107 to S110).

Then, the update data extracted from the request is written to the update address in a primary volume 401 (S111), and the differential data extracted from the request is written into the differential volume 402 (S112). The address where this differential data is written is the storage area of the differential data included in the mapping information that was extracted from the request. Then, the mapping information extracted from the request is written to the mapping table 403 (S113). After that, the updating of the data on the remote side is complete, so a completion is informed to the local-side disk subsystem 2 (S114).

The local-side data transfer module that sent the request monitors the receiving of the information of completion (S115). Then, when the local-side data transfer module receives the information of completion from the remote-side disk subsystem 4, the update data is written into the primary volume 201 (S116), and then the differential data that was read at S103 is written into the differential volume 202 (S117), and the mapping information created at S104 is written into the mapping table (S118).

In this way, in the data transfer processing according to the first embodiment, the update data necessary for the differential snapshot, the differential data, and the mapping information are combined as a group, and are sent from the local-side disk subsystem 2 to the remote-side disk subsystem 4. Therefore, even if damage occurs while the data is transferred from the local side to the remote side, inconsistencies in the snapshot data can be avoided.

Figure 6:
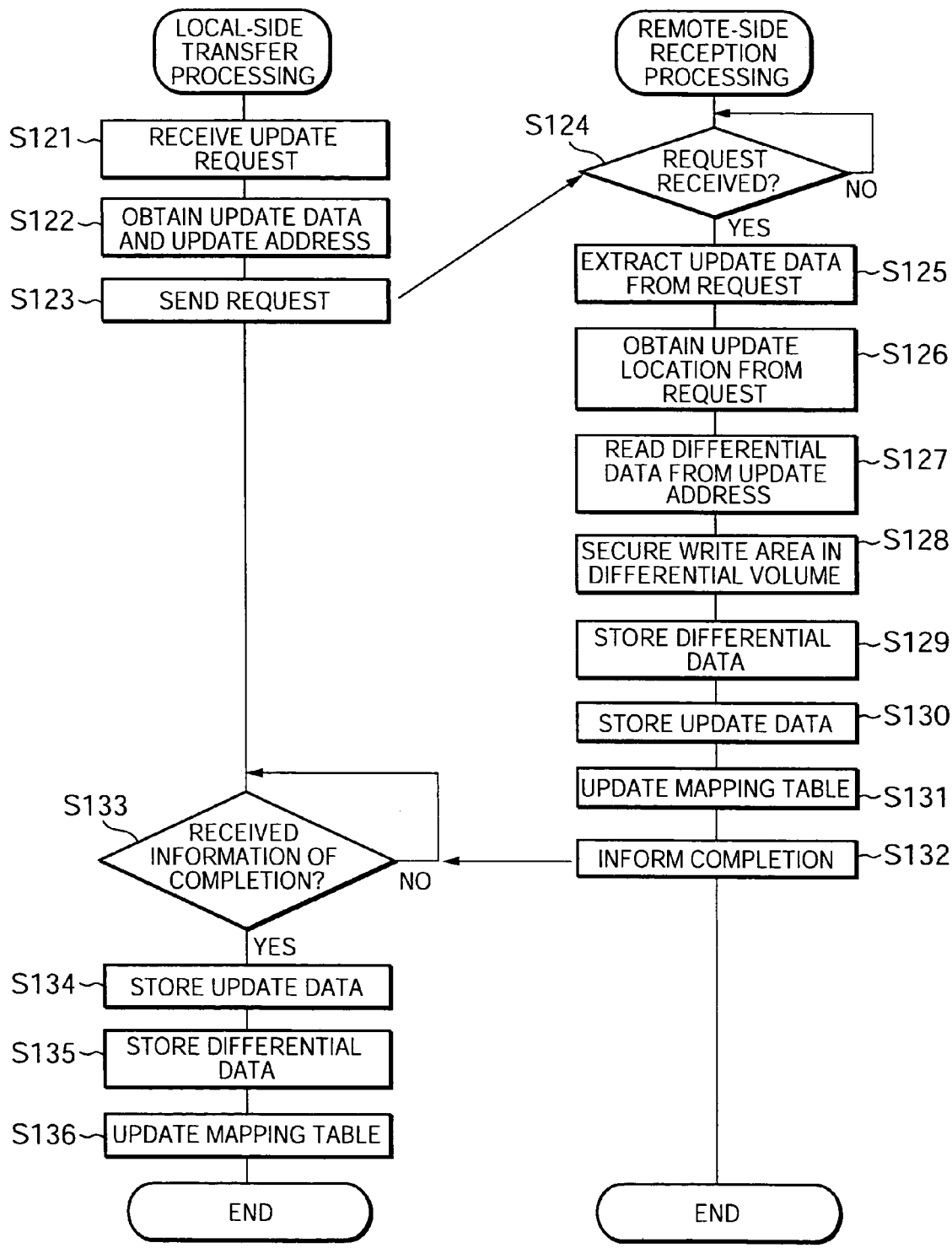
FIG. 6 is a flowchart of data transfer processing according to a second embodiment of this invention.

FIG. 6 is a flowchart of data transfer processing according to a second embodiment of this invention. In the data transfer processing according to the second embodiment, the data transferred from the local side to the remote side is kept at a minimum level, and the transfer performance improves.

First, when the data update request by the differential snapshot management program 123 (i.e., the occurrence of the copy-on-write based on the update request) is received (S121), the local-side data transfer module analyzes the update request, and extracts the update data (the data to be written to the disk) and the data update address (the address where the data is to be written), which are included in the update request (S122). Then, the update data and the update address which were obtained are included in the request, and this request is sent to the remote-side disk subsystem 4 (S123).

The remote-side data transfer module monitors the receiving of the request (S124). When the remote-side data transfer module receives the request from the local-side disk subsystem 2, the update data and the update address are extracted from the received request (S125 and S126).

Then, the differential data that is stored in the update address in the primary volume 401 (the update address extracted from the request) is read out (S127). Then, the area for writing the differential data is secured in the differential volume 402 (S128), and the differential data that was read out at S127 is written into the area in the differential volume 402 which was secured at S128 (S129). After that, the update data that was extracted from the request is written to the update address extracted from the request (S130), and the area where the differential data was stored is written to the update address of the mapping table (S131). After that, since the updating of the data on the remote side is complete, the completion is informed to the local-side disk subsystem 2 (S132).

The local-side data transfer module that sent the request monitors the receiving of the information of completion (S133). Then, when the local-side data transfer module receives the information of completion from the remote-side disk subsystem 4, the differential data that is stored in the update address in the primary volume 201 is read out and the update data is written to the update address (S134). Then, the differential data read from the update address is stored into the differential volume 202 (S135), and the area where the differential data is stored is written to the update address of the mapping table (S136).

In this way, in the data transfer processing according to the second embodiment, the data that is transferred from the local side to the remote side is limited to only the update data and the storage address, and the other information that is necessary for the copy-on-write (i.e., the differential data and the mapping table information) is obtained on the remote side. Accordingly, the data that is transferred from the local side to the remote side can be kept at the minimum level, the time necessary for the transfer processing can be shortened, and the transfer performance can be improved. Furthermore, increases in the load on the data transfer network 5 can be reduced.

Figure 7:
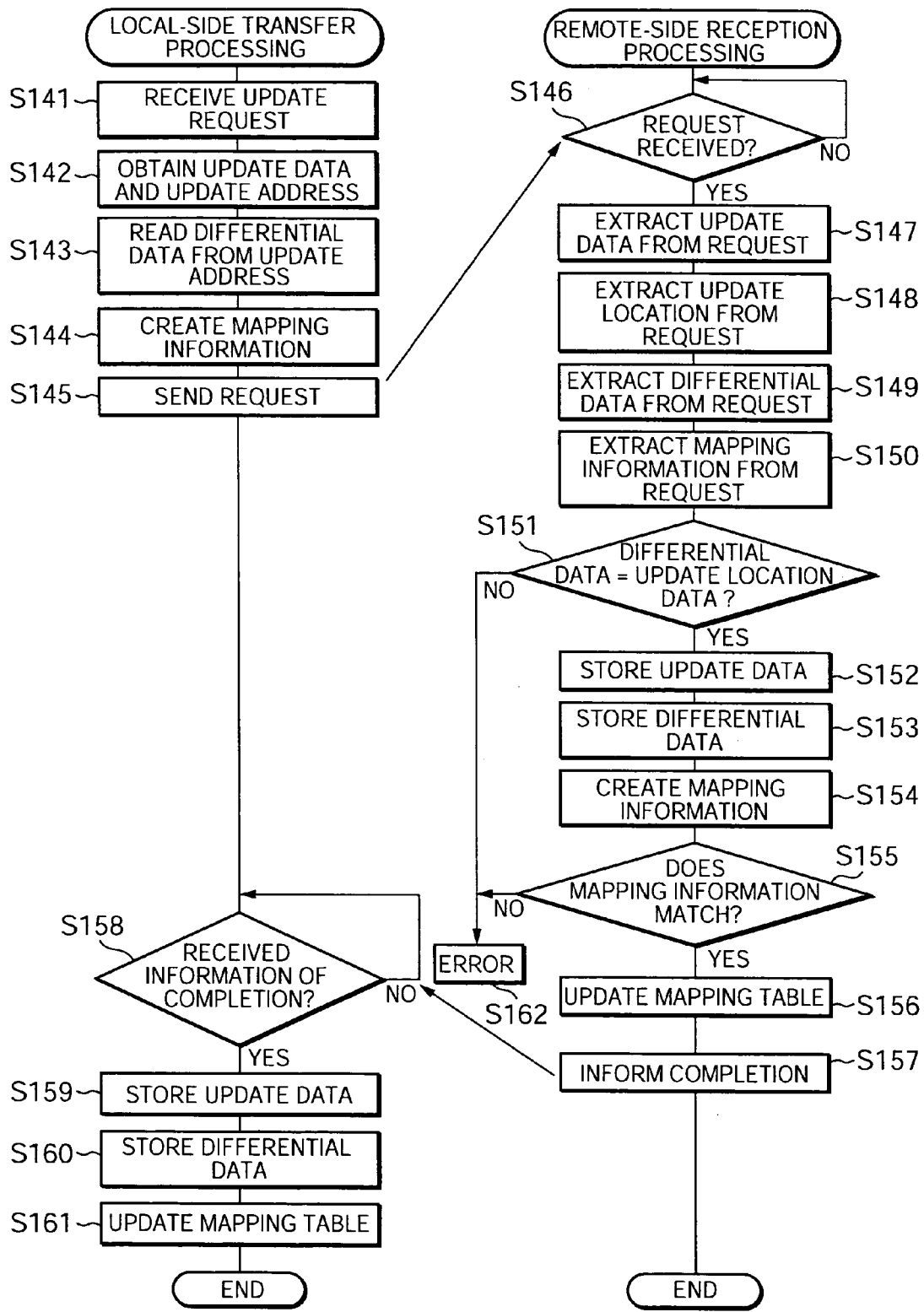
FIG. 7 is a flowchart of data transfer processing according to a third embodiment of this invention.

FIG. 7 is a flowchart of data transfer processing according to a third embodiment of this invention. In the data transfer processing according to the third embodiment, after confirming that the differential data and the mapping table match each other, the data is then updated, thus making the data synchronization more reliable.

First, when the data update request by the differential snapshot management program 123 (i.e., the occurrence of the copy-on-write based on the update request) is received (S141), the local-side data transfer module analyzes the update request, and extracts the update data (the data to be written to the disk) and the data update address (the address where the data is to be written), which are included in the update request (S142). Then, the differential data (the pre-update data) stored in the update address in the primary volume 201 is read out (S143). Furthermore, the area in the differential volume to store the differential data is determined, and the mapping information after data is updated (the information about the area for storing the differential data, which is written in the update address of the mapping table) is created (S104). It should be noted that at this stage, the mapping information is not written into the mapping table 203.

Then, the obtained update data, the update address, the differential data, and the mapping information are combined as a group and included in a request, and this request is sent to the remote-side disk subsystem 4 (S145).

The remote-side data transfer module monitors the receiving of the request (S146). When the remote-side data transfer module receives the request from the local-side disk subsystem 2, the update data, the update address, the differential data, and the mapping information are extracted from the request that was received (S147 through S150).

Then, it is determined whether the data that is stored in the update address of the primary volume 401 is equivalent to the differential data that was extracted from the request (S151). For the negative result, it is then determined that the transferred data is irregular, and an error is informed to an administrator (S162). On the other hand, for the positive result, it is determined that the transferred data is not irregular, so that the update data that was extracted from the request is written to the update address in the primary volume 401 (S152).

Then, the differential data that was extracted from the request is written into the differential volume 402 (S153). The address where the differential data is written corresponds to the storage area of the differential data that is included in the mapping information extracted from the request. After that, the mapping information after-data is updated (the information about the area for storing the differential data written to the update address in the mapping table) is created (S154).

Then, it is determined whether the mapping information created at S154, and the mapping information extracted from the request, match each other (S155). When the result is that both sets of mapping information do not match each other, it is then determined that the transferred data is irregular, and an error is informed to the administrator (S162). It should be noted that at this time the differential data is written to the update address of the primary volume 401, or the data that was written into the differential volume 402 is deleted, whereby the primary volume 401 and the differential volume 402 may return to the pre-update state.

On the other hand, if both sets of mapping information match each other, then it is determined that the transferred data does not have fault, and the mapping information extracted from the request is written into the mapping table 403 (S156). After that, since the updating of the data on the remote side is complete, a completion is informed to the local-side disk subsystem 2 (S157).

The local-side data transfer module that sent the request monitors the receiving of the information of completion (S158). Then, when the local-side data transfer module receives the information of completion from the remote-side disk subsystem 4, the update data is written into the primary volume 201 (S159), the differential data that was read at S143 is written into the differential volume 202 (S160), and the mapping information created at S144 is written into the mapping table (S161).

In this way, in the data transfer processing according to the third embodiment, the update data, the storage address of the update data, the differential data, and the mapping information are transferred from the local side to the remote side, and it is confirmed that the differential data on the local side and the differential data on the remote side match each other before writing the update data. Furthermore, it is confirmed that the mapping information created on the local side and the mapping information created on the remote side match each other before updating the mapping table. Therefore, in addition to the effects of the first embodiment, the reliability of the data transfer can be improved even further.

Figure 8:
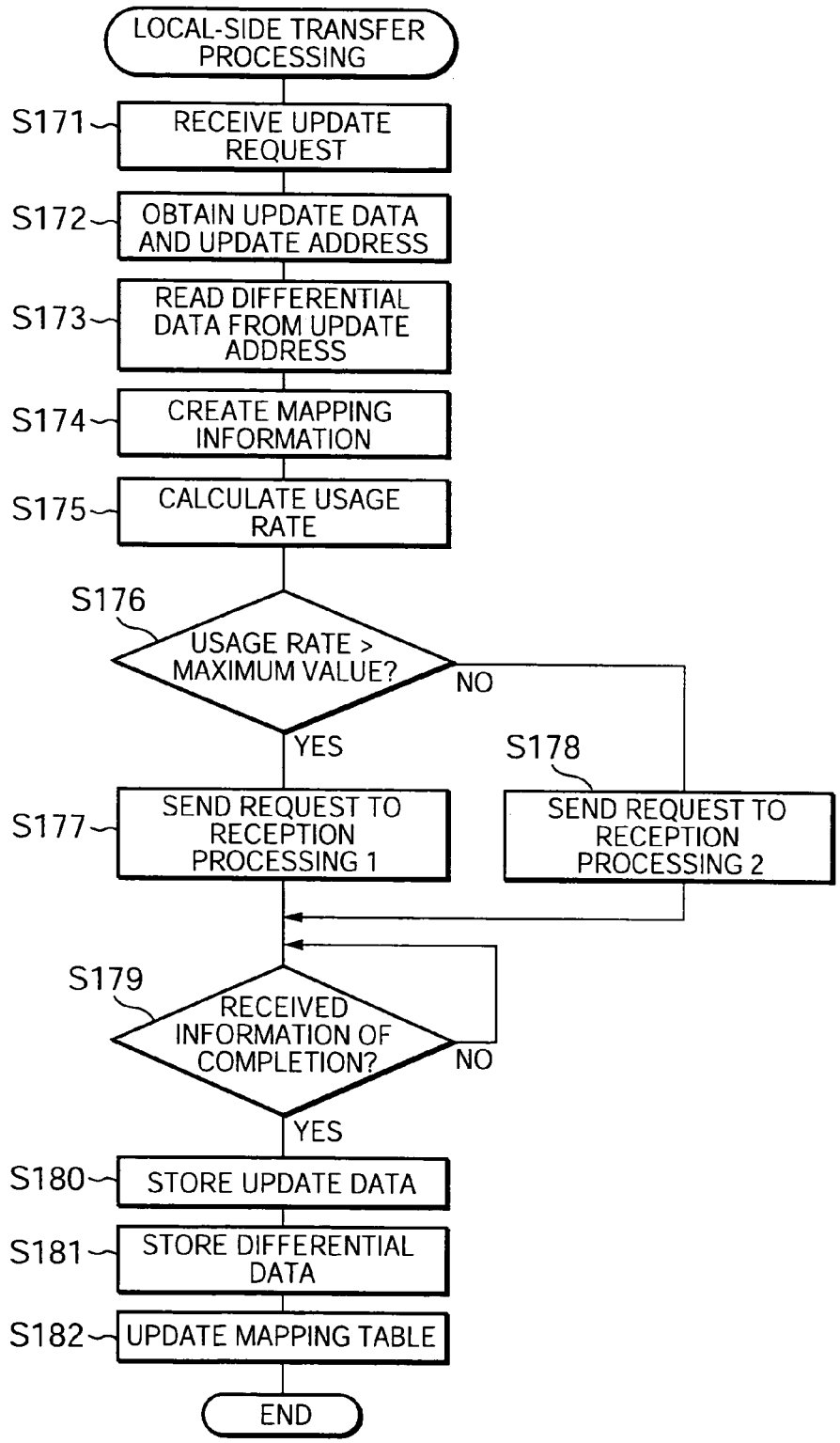
FIG. 8 is a flowchart of local side data transfer processing, which is part of data transfer processing according to a fourth embodiment of this invention.
Figure 9:
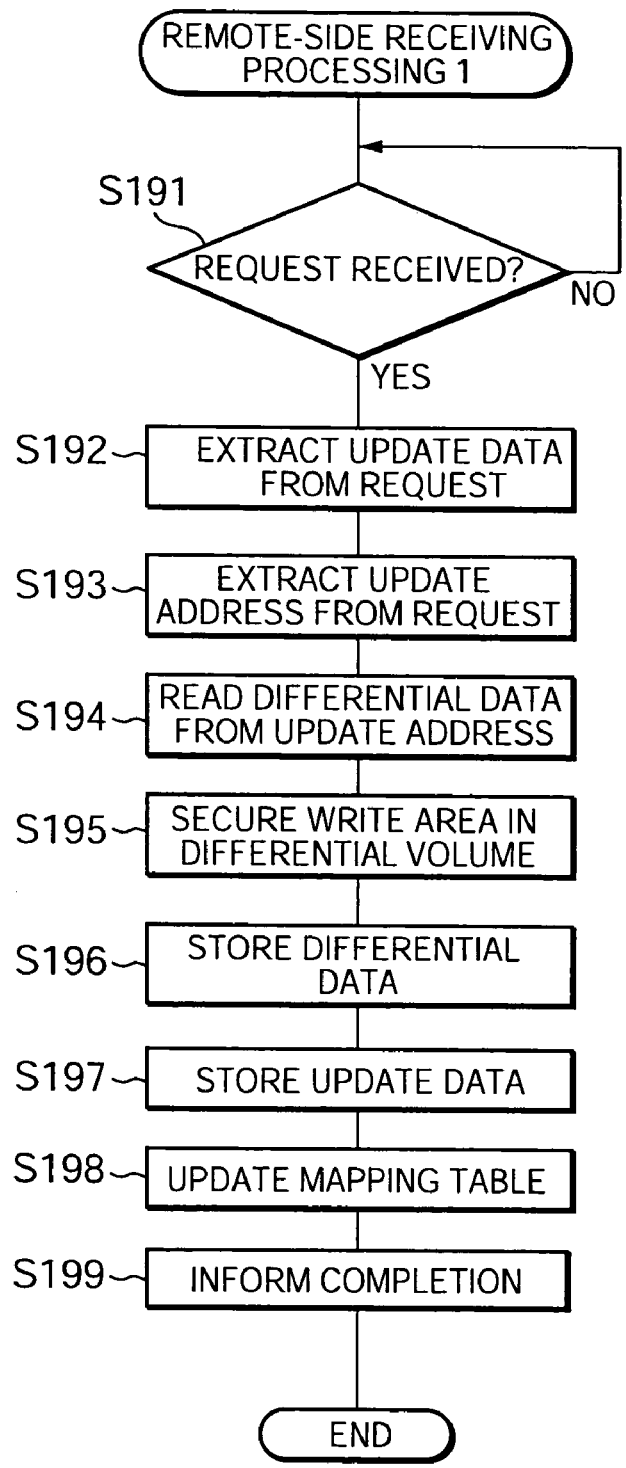
FIG. 9 is a flowchart of remote-side data receiving processing 1, which is part of the data transfer processing according to the fourth embodiment of this invention.
Figure 10:
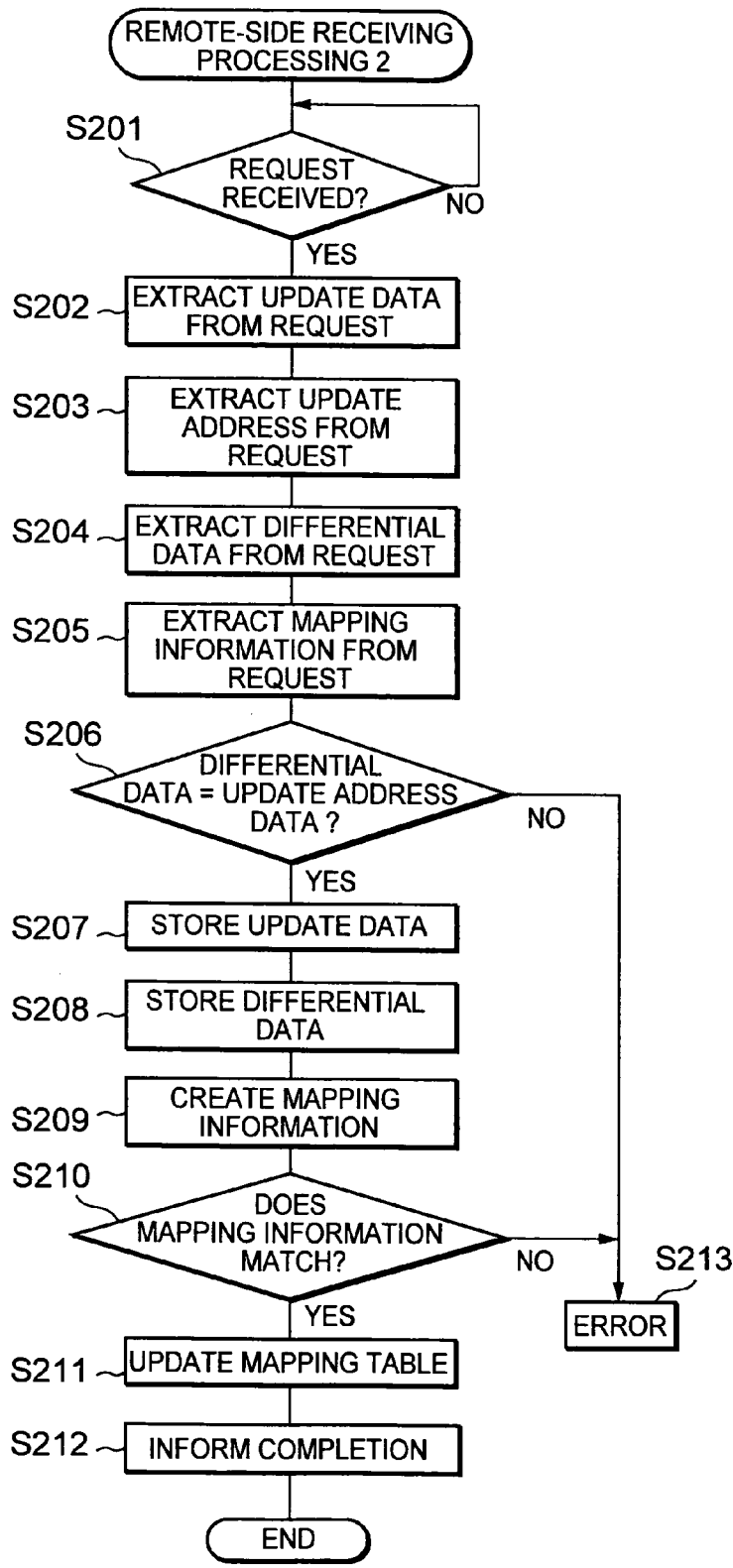
FIG. 10 is a flowchart of remote-side data receiving processing 2, which is part of the data transfer processing according to the fourth embodiment of this invention.

FIGS. 8 to 10 are flowcharts of data transfer processing according to a fourth embodiment of this invention. The data transfer processing of the fourth embodiment differs from the processing in the embodiments mentioned above in that a data transfer method changes depending on the level of congestion on the data transfer network 5.

FIG. 8 is a flowchart of data transfer processing of the local-side disk subsystem.

First, when the data update request by the differential snapshot management program 123 (i.e., the occurrence of the copy-on-write based on the update request) is detected (S171), the local-side data transfer module analyzes the update request, and extracts the update data (the data to be written to the disk) and the data update address (the address where the data is to be written), which are included in the update request (S172). Then, the differential data (the pre-update data) stored in the update address in the primary volume 201 is read out (S173). Furthermore, the area in the differential volume for storing the differential data is determined, and the mapping information after data is updated (the information about the area for storing the differential data, which is written in the update address of the mapping table) is created (S174). It should be noted that at this stage, the mapping information is not written into the mapping table 203.

After that, the local-side data transfer module monitors the usage rate of the data transfer network 5 and calculates this usage rate (S175). This usage rate can be calculated, for example, by dividing the amount of data sent for the past 1 hour by the line speed per hour (the amount of data that can be transferred per hour).

Then, the calculated usage rate and a pre-set maximum value are compared (S176). When the result is that the network usage rate exceeds the maximum value, it is then determined that the load on the data transfer network 5 is great. Then, the obtained update data and update address are included in a request, and the request is sent to the receiving processing 1 of the remote-side disk subsystem 4 (S177).

On the other hand, if the network usage rate is not beyond the maximum value, then it is determined that the load on the data transfer network 5 is small (or there is still room), so that the obtained update data, update address, differential data and mapping information are combined as a group and included in the request, and the request is sent to the receiving processing 2 of the remote-side disk subsystem 4 (S178).

The local-side data transfer module that sent the request monitors the receiving of the information of completion (S179). Then, when the local-side data transfer module receives the information of completion from the remote-side disk subsystem 4, the update data is written into the primary volume 201 (S180), and the differential data that was read out at S173 is written into the differential volume 202 (S181), and the mapping information that was created at S174 is written into the mapping table (S182).

FIG. 9 is a flowchart of the receiving processing 1 by the remote-side disk subsystem.

The remote-side data transfer module monitors the receiving of the request (S191). When the remote-side data transfer module receives the request for the receiving processing 1 from the local-side disk subsystem 2, the update data and the update address are extracted from the received request (S192 and S193).

Then, the differential data being stored in the update address in the primary volume 401 (the update address extracted from the request) is read out (S194). Then, area for writing the differential data is secured in the differential volume 402 (S195), and the differential data that was read out at S194 is written into the area of the differential volume 402 that was secured at S195 (S196). After that, the update data that was extracted from the request is written to the update address that was extracted from the request (S197). The area where the differential data is stored is written to the update address in the mapping table (S198). After that, since the updating of the data on the remote side is complete, a completion is informed to the local-side disk subsystem 2 (S199).

FIG. 10 is a flowchart of the receiving processing 2 by the remote-side disk subsystem.

The remote-side data transfer module monitors the receiving of the request (S201). When the remote-side data transfer module receives the request for the receiving processing 1 from the local-side disk subsystem 2, the update data, the update address, the differential data, and the mapping information are extracted from the request that was received (S202 to S205).

Then, it is determined whether the data that is stored in the update address of the primary volume 401 is equivalent to the differential data that was extracted from the request (S206). For the negative result, it is then determined that the transferred data is irregular, and an error is informed to an administrator (S213). On the other hand, for the positive result, then it is determined that the transferred data is not irregular, so that the update data that was extracted from the request is written to the update address in the primary volume 401 (S207).

Then, the differential data that was extracted from the request is written into the differential volume 402 (S208). The address where the differential data is written corresponds to the storage area of the differential data that is included in the mapping information extracted from the request. After that, the mapping information after data is updated (the information about the area for storing the differential data written to the update address in the mapping table) is created (S209).

Then, it is determined whether the mapping information created at S209, and the mapping information extracted from the request, match each other (S210). When the result is that both sets of mapping information do not match each other, it is then determined that the transferred data is irregular, and an error is informed to the administrator (S213). It should be noted that at this time the differential data is written to the update address of the primary volume 401, or the data that was written into the differential volume 402 is deleted, whereby the primary volume 401 and the differential volume 402 may return to the pre-update state.

On the other hand, if both sets of mapping information match each other, then it is determined that the transferred data is not irregular, and the mapping information extracted from the request is written into the mapping table 403 (S211). After that, since the updating of the data on the remote side is complete, a completion is informed to the local-side disk subsystem 2 (S212).

In this way, in the data transfer processing according to the fourth embodiment, depending on the load status (line usage rate) of the data transfer network 5 connected to the local side and the remote side, the data transferred from the local side to the remote side changes. That is, when the lines are congested, the volume of transferred data is reduced, and when the lines are not congested, redundant data is added for the copy-on-write, thus securing reliability.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising a primary disk subsystem having a disk drive provided for normal operation, a first file server that controls input and output of data to/from the primary disk subsystem, a secondary disk subsystem having a disk drive that stores a duplicate of data stored in the primary disk subsystem, a second file server that controls input and output of data to/from the secondary disk subsystem, and a communications line that connects the primary disk subsystem and the secondary disk subsystem, the primary disk subsystem comprising a primary volume where normal reading and writing are performed, a first differential volume that is arranged to store differential data of a snapshot of the primary volume, a first management information holding module that manages the differential data in the primary volume, and a first data transfer module that transfers data to the secondary disk subsystem, the secondary disk subsystem comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary disk subsystem, the first file server and the second file server each comprising a host input/output control module that sends and receives data and a control signal to/from a host, a disk input/output control module that transfers data and a control signal between the primary disk subsystem and secondary disk subsystem, a cache memory that temporarily stores data sent and received to/from the host input/output control module and the disk input/output control module, a CPU that controls operations of the first file server and second file server by executing a control program, and a memory where the control program is stored, wherein:

the first data transfer module collectively sends update data to be written into the primary volume, an update address in the primary volume where the update data is to be written, differential data stored at the update address in the primary volume, and management information including a storage address in the first differential volume for the differential data, to the second data transfer module;

the second data transfer module:

stores the update data sent from the first data transfer module to an update address in the secondary volume;

stores the differential data sent from the first data transfer module to the second differential volume;

updates the second management information holding module based on the management information sent from the first data transfer module; and then informs completion of data updating to the first data transfer module; and the first data transfer module:

when the information of completion of the data updating is received from the second data transfer module:

stores the update data to the update address in the primary volume;

stores the differential data stored at the update address in the primary volume, into the storage address of the first differential volume; and updates the first management information holding module.

2. A storage system, comprising a primary disk subsystem having a disk drive provided for normal operation, a secondary disk subsystem having a disk drive that stores a duplicate of data stored in the primary disk subsystem, and a communications line that connects the primary disk subsystem and the secondary disk subsystem, the primary disk subsystem comprising a primary volume where normal reading and writing are performed, a first differential volume that is arranged to store differential data of a snapshot of the primary volume, a first management information holding module that manages the differential data in the primary volume, and a first data transfer module that transfers data to the secondary disk subsystem, the secondary disk subsystem comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary disk subsystem, wherein the first data transfer module collectively sends update data to be written into the primary volume, an update address in the primary volume where the update data is to be written, the differential data stored at the update address in the primary volume, and management information including the storage address in the first differential volume for the differential data, to the second data transfer module; and the second data transfer module:

stores the update data sent from the first data transfer module to an update address in the secondary volume;

stores the differential data sent from the first data transfer module into the second differential volume;

updates the second management information holding module based on the management information sent from the first data transfer module; and then informs completion of data updating to the first data transfer module, and the first data transfer module:

when the information of completion of the data updating is received from the second data transfer module, stores the update data to the undated address in the primary volume;

stores the differential data stored at the update address in the primary volume, into the storage address of the first differential volume; and updates the first management information holding module.

3. The storage system according to claim 2, wherein the second data transfer module:

compares the differential data sent from the first data transfer module and the differential data stored at the update address in the second differential volume;

as a result of the comparison, when the differential data sent from the first data transfer module matches the differential data stored at the update address in the second differential volume, stores the update data sent from the first data transfer module to the update address in the secondary volume;

stores the differential data sent from the first data transfer module into the second differential volume;

compares the management information sent from the first data transfer module and management information generated based on a storage address where the differential data is to be stored in the second differential volume;

when the management information sent from the first data transfer module matches the management information generated based on the storage address where the differential data is to be stored in the second differential volume updates the second management information holding module based on the management information sent from the first data transfer module; and then informs completion of the data updating to the first data transfer module.

4. The storage system according to claim 2, wherein:

the first data transfer module:

judges a load status of the communications line; and as the result of judgment, when a load on the communications line is great, sends the update data to be written into the primary volume and the update address in the primary volume where the update data is to be written, to the second data transfer module;

the second data transfer module:

reads the differential data stored in the update address in the secondary volume and stores the differential data into the second differential volume;

stores the update data sent from the first data transfer module to the update address in the secondary volume;

updates the second management information holding module based on the storage address where the differential data is to be stored into the second differential volume; and then informs the completion of the data updating to the first data transfer module; and the first data transfer module, when the information of completion of the data updating is received from the second data transfer module:

stores the update data to the update address in the primary volume;

stored at the update address in the primary volume, stores the differential data into the storage address of the first differential volume; and updates the first management information holding module.

5. A storage system, comprising a primary disk subsystem having a disk drive provided for normal operation, a secondary disk subsystem having a disk drive that stores a duplicate of data stored in the primary disk subsystem, and a communications line that connects the primary disk subsystem and the secondary disk subsystem, the primary disk subsystem comprising a primary volume where normal reading and writing are performed, a first differential volume that is arranged to store differential data of a snapshot of the primary volume, a first management information holding module that manages the differential data in the primary volume, and a first data transfer module that transfers data to the secondary disk subsystem, the secondary disk subsystem comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary disk subsystem, wherein:

the first data transfer module sends update data to be written into the primary volume to the second data transfer module;

the second data transfer module:

stores the update data in the secondary volume;

stores the differential data stored at the update address in the secondary volume, into the second differential volume;

updates the second management information holding module; and then informs completion of data updating to the first data transfer module; and the first data transfer module:

when the information of completion of the data updating is received from the second data transfer module,
stores the update data to the update address in the primary volume;
stores the differential data stored at the update address in the primary volume, into the first differential volume;
updates the first management information holding module;
judges a load status of the communications line, and
as the result of judgment, when a load on the communications line is small,
collectively sends the update data to be written into the primary volume, the update address in the primary volume where the update data is to be written, the differential data stored at the update address in the primary volume, and the management information including a storage address in the first differential volume for the differential data, to the second data transfer module;
the second data transfer module:
compares the differential data sent from the first data transfer module and the differential data stored in the update address in the second differential volume;
as a result of the comparison, when the differential data sent from the first data transfer module matches the differential data stored at the update address in the second differential volume,
stores the update data sent from the first data transfer module to the update address in the secondary volume;
stores the differential data sent from the first data transfer module into the second differential volume;
compares the management information sent from the first data transfer module and management information generated based on a storage address where the differential data is to be stored in the second differential volume;
as a result of the comparison, when the management information sent from the first data transfer module matches the management information generated based on the storage address where the differential data is to be stored in the second differential volume,
updates the second management information holding module based on the management information sent from the first data transfer module; and
then informs completion of the data updating to the first data transfer module; and
the first data transfer module, upon receiving the information of completion of the data updating from the second data transfer module:
stores the update data to the update address in the primary volume;
stores the differential data stored at the update address in the primary volume into the first differential volume; and
updates the first management information holding module.

6. A storage device used in a storage system comprising a primary storage device having a disk drive provided for normal operation, a secondary storage device having a disk drive that stores a duplicate of data stored in the primary storage device, and a communications line that connects the primary storage device and the secondary storage device,
the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device,
the secondary storage device comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary storage device,
wherein the first data transfer module:
sends update data to be written into the primary volume to the second data transfer module;
stores the update data to an update address in the primary volume when information of completion is received from the second data transfer module;
stores the differential data stored at the update address in the primary volume into the first differential volume; and
updates the first management information holding module,
wherein the first data transfer module collectively sends the update data to be written into the primary volume, the update address in the primary volume where the update data is to be written, the differential data stored at the update address in the primary volume, and the management information including a storage address in the first differential volume for the differential data, to the second data transfer module.

7. A storage device used in a storage system comprising a primary storage device having a disk drive provided for normal operation, a secondary storage device having a disk drive that stores a duplicate of data stored in the primary storage device, and a communications line that connects the primary storage device and the secondary storage device,
the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device,
the secondary storage device comprising a secondary volume that is arranged to store a duplicate of the data stored in the primary volume, a second differential volume that stores differential data of a snapshot of the secondary volume, a second management information holding module that manages the differential data in the secondary volume, and a second data transfer module that transfers data to the primary storage device,
wherein the first data transfer module:
sends update data to be written into the primary volume to the second data transfer module;
stores the update data to an update address in the primary volume when information of completion is received from the second data transfer module;
stores the differential data stored at the update address in the primary volume into the first differential volume; and
updates the first management information holding module,
wherein the first data transfer module:
judges a load status of the communications line;
as the result of judgment, when a load on the communications line is great:

sends the update data to be written into the primary volume and the update address where the update data is to be written, to the second data transfer module;

when the information of completion of the data updating is received from the second data transfer module, stores the update data to the update address in the primary volume;

stores the differential data stored at the update address in the primary volume into the first differential volume; and updates the first management information holding module.

8. A storage device used in a storage system comprising a primary storage device having a disk drive provided for normal operation, a secondary storage device having a disk drive that stores a duplicate of data stored in the primary storage device, and a communications line that connects the primary storage device and the secondary storage device, the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device, the secondary storage device comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary storage device, wherein the first data transfer module:

sends update data to be written into the primary volume to the second data transfer module;

stores the update data to an update address in the primary volume when information of completion is received from the second data transfer module;

stores the differential data stored at the update address in the primary volume into the first differential volume; and updates the first management information holding module, wherein the first data transfer module:

judges a load status of the communications line;

as the result of judgment, when a load on the communications line is small:

collectively sends the update data to be written into the primary volume, the update address in the primary volume where the update data is to be written, the differential data stored at the update address in the primary volume, and the management information including the storage address in the first differential volume for the differential data, to the second data transfer module;

upon receiving information of completion of the data updating from the second data transfer module, stores the update data to the update address in the primary volume;

stores the differential data stored at the update address in the primary value into the first differential volume; and updates the first management information holding module.

9. A storage device used by a storage system comprising a primary storage device having a disk drive provided for normal operation, a secondary storage device having a disk drive that stores a duplicate of data stored in the primary storage device, and a communications line that connects the primary storage device and the secondary storage device, the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device, the secondary storage device comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary storage device, wherein the second data transfer module:

receives the update data sent from the first data transfer module to be written into the secondary volume;

stores the update data into the secondary volume;

stores the differential data written to the update address in the secondary volume, into the second differential volume;

updates the second management information holding module; and then informs completion of the data updating to the primary storage device; and wherein the second data transfer module:

receives from the first data transfer module a signal obtained by combining the update data to be written into the primary volume, the update address in the primary volume where the update data is to be written, the differential data stored at the update address in the primary volume, and the management information including a storage address in the first differential volume for the differential data;

stores the received update data to the update address in the secondary volume;

stores the received differential data into the second differential volume, updates the second management information holding module based on the received management information; and then informs completion of the data updating to the first data transfer module.

10. The storage device according to claim 9, wherein the second data transfer module:

compares the received differential data and the differential data stored at the update address in the secondary volume;

as a result of the comparison, when the received differential data matches the differential data stored at the update address in the secondary volume;

stores the update data sent from the first data transfer module to the update address in the secondary volume;

stores the received differential data into the secondary volume;

compares the received management information and management information generated based on the storage address where the differential data is to be stored into the second differential volume;

when the received management information matches the management information generated based on the storage address where the differential data is to be stored into the second differential volume, updates the second management information holding module based on the received management information; and then informs completion of the data updating to the first data transfer module.

11. A storage device used by a storage system comprising a primary storage device having a disk drive provided for normal operation, a secondary storage device having a disk drive that stores a duplicate of data stored in the primary storage device, and a communications line that connects the primary storage device and the secondary storage device, the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device, the secondary storage device comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary storage device, wherein the second data transfer module:

receives the update data sent from the first data transfer module to be written into the secondary volume;

stores the update data into the secondary volume;

stores the differential data written to the update address in the secondary volume, into the second differential volume;

updates the second management information holding module; and then informs completion of the data updating to the primary storage device; and wherein the second data transfer module:

when the first data transfer module judges that a load status on the communications line is great, receives the update data to be written into the primary volume and the update address where the update data is to be written from the first data transfer module;

reads the differential data stored at the update address in the secondary volume and stores the differential data into the second differential volume;

stores the received update data to the update address in the secondary volume;

updates the second management information holding module based on the storage address where the differential data is to be stored into the second differential volume; and then informs completion of the data updating to the first data transfer module.

12. A storage device used by a storage system comprising a primary storage device having a disk drive provided for normal operation, a secondary storage device having a disk drive that stores a duplicate of data stored in the primary storage device, and a communications line that connects the primary storage device and the secondary storage device, the primary storage device comprising a primary volume where normal reading and writing are performed, a first differential volume that is arranged to store differential data of a snapshot of the primary volume, a first management information holding module that manages the differential data in the primary volume, and a first data transfer module that transfers data to the secondary storage device, the secondary storage device comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary storage device, wherein the second data transfer module:

receives the update data sent from the first data transfer module to be written into the secondary volume;

stores the update data into the secondary volume;

stores the differential data written to the update address in the secondary volume, into the second differential volume;

updates the second management information holding module; and then informs completion of the data updating to the primary storage device; and wherein the second data transfer module:

when the first data transfer module judges that a load on the communications line is small, receives from the first data transfer module a signal obtained by combining the update data to be written into the primary volume, the update address where the update data is to be written, the differential data stored at the update address in the primary volume, and the management information including the storage address in the first differential volume for the differential data;

compares the received differential data and the differential data stored at the update address in the secondary volume;

as a result of the comparison, when the received differential data matches the differential data stored in the update address in the secondary volume;

stores the update data sent from the first data transfer module to the update address in the secondary volume;

stores the received differential data into the second differential volume;

compares the received management information and management information generated based on the storage address where the differential data is to be stored in the second differential volume;

as the result of comparison, when the received management information matches the management information generated based on the storage address where the differential data is to be stored in the second differential volume;

updates the second management information holding module based on the management information sent from the first data transfer module; and then informs completion of the data updating to the first data transfer module.

13. A remote copy method used in a storage system comprising a primary disk subsystem having a disk drive provided for normal operation, a secondary disk subsystem having a disk drive that stores a duplicate of data stored in the primary disk subsystem, and a communications line that connects the primary disk subsystem and the secondary disk subsystem, the primary disk subsystem comprising a primary volume where normal reading and writing are performed, a first differential volume that is arranged to store differential data of a snapshot of the primary volume, a first management information holding module that manages the differential data in the primary volume, and a first data transfer module that transfers data to the secondary disk subsystem, the secondary disk subsystem comprising a secondary volume that stores a duplicate of the data stored in the primary volume, a second differential volume that is arranged to store differential data of a snapshot of the secondary volume, a second management information holding module that manages the differential data in the secondary volume, and a second data transfer module that transfers data to the primary disk subsystem, the remote copy method comprising:

a first step of controlling the first data transfer module to send the update data to be written into the primary volume to the second data transfer module;

a second step of controlling the second data transfer module to:

store the update data sent from the first data transfer module into the secondary volume;

store the differential data written at an update address where the update data is to be stored in the secondary volume, into the second differential volume;

update the second management information holding module; and then inform the completion of data updating to the first data transfer module; and a third step of controlling the first data transfer module to:

store the update data to the update address in the primary volume when information of completion is received from the second data transfer module;

store the differential data stored at the update address in the primary volume, into the first differential volume; and update the first management information holding module; and the first step comprises controlling the first data transfer module to collectively send the update data to be written into the primary volume, the update address in the primary volume where the update data is to be written, the differential data stored at the update address in the primary volume, and the management information including a storage address in the first differential volume for the differential data, to the second data transfer module; and the second step comprises controlling the second data transfer module to: compare the differential data sent from the first data transfer module and the differential data stored at the update address in the secondary volume; store the update data sent from the first data transfer module to the update address in the secondary volume when the differential data sent from the first data transfer module matches the differential data stored at the update address in the secondary volume; store the differential data sent from the first data transfer module into the second differential volume; compare the management information sent from the first data transfer module and management information generated based on the storage address where the differential data is to be stored in the second differential volume; update the second management information holding module based on the management information sent from the first data transfer module when the management information sent from the first data transfer module matches the management information generated based on the storage address where the differential data is to be stored in the second differential volume; and then inform completion of the data updating to the first data transfer module.

* * * * *